United States Patent [19]

Shinoda et al.

[11] 4,053,749
[45] Oct. 11, 1977

[54] DISTANCE METER FOR VEHICLE CAPABLE OF DISPLAYING TRAVELLING DISTANCE TO DESTINATION

[75] Inventors: Yoshio Shinoda, Okazaki; Akira Kuno, Nagoya, both of Japan

[73] Assignee: Nippon Soken, Inc., Nishio, Japan

[21] Appl. No.: 672,630

[22] Filed: Mar. 31, 1976

[30] Foreign Application Priority Data

May 15, 1975 Japan .................................. 50-58235

[51] Int. Cl.² ............................................. G01C 22/02
[52] U.S. Cl. ............................... 364/424; 235/92 DN;
 235/95 R; 364/467; 364/561
[58] Field of Search ......... 235/151.32, 92 DN, 92 PE,
 235/92 T, 92 FQ, 150.2, 95 R, 97; 343/112 D,
 12 R; 340/56; 33/125 R, 133, 142

[56] References Cited

U.S. PATENT DOCUMENTS

| 3,780,272 | 12/1973 | Rohner | 235/95 R |
| 3,846,701 | 11/1974 | Sampey | 235/92 FQ |
| 3,872,288 | 3/1975 | Sampey | 235/92 DN |

*Primary Examiner*—Malcolm A. Morrison
*Assistant Examiner*—Errol A. Krass
*Attorney, Agent, or Firm*—Cushman, Darby & Cushman

[57] ABSTRACT

A distance meter for vehicles wherein the distance to be travelled from the place of departure to a destination is preset and on the way to the destination the distance travelled since the departure of the vehicle is subtracted from the preset travelling distance whereby to always display the remaining distance to the destination. The number of operations of the switch are counted to determine each preset digit. Its presetting circuit for presetting the travelling distance to a destination, computing circuit and display circuit each consists of an electronic circuit.

5 Claims, 6 Drawing Figures

DISTANCE METER FOR VEHICLE CAPABLE OF DISPLAYING TRAVELLING DISTANCE TO DESTINATION

BACKGROUND OF THE INVENTION

1. Field of the Invention

The present invention relates to a distance meter of the type which is installed in a vehicle, particularly automotive vehicle for indicating the travelling distance to a destination.

2. Description of the Prior Art

Heretofore, there has been only one choice for the occupants of a vehicle, particularly automotive vehicle running on the road to resort to the information on road signs in knowing the distance to his destination and no means has been available when the occupants desire to know the remaining distance to the destination at any point on the way thereto.

SUMMARY OF THE INVENTION

It is an object of the present invention to provide a distance meter for vehicles which is capable of informing the occupants of a vehicle of the distance to a destination on the way thereto.

It is another object of the invention to provide a distance meter for vehicles wherein the computation of the travelling distance to a destination is accomplished by electronic circuitry.

In accomplishing these and other equally desirable objects, the improved distance meter provided in accordance with this invention is designed so that the travelling distance (hereinafter referred to as A) from the place of departure to a destination is preset at the departure place and on the way to the destination the distance travelled (hereinafter referred to as B) since the departure is measured to compute the difference (A-B) between the two distances and display the result of the computation.

The device of this invention has among its great advantages the fact that it enables the occupants of a vehicle to always know the exact distance to a destination and in particular the driver is enabled to always obtain the exact knowledge on the distance to the destination without having recourse to the information on road signs thereby relieving the driver from feeling of uneasiness and improving the driving safety.

BRIEF DESCRIPTION OF THE DRAWING

These and other objects, features and advantages of the present invention will be apparent from the following description taken in conjunction with the accompanying drawings, in which.

DESCRIPTION OF THE PREFERRED EMBODIMENT

The present invention will now be described in greater detail with reference to the illustrated embodiment.

Figure 1:
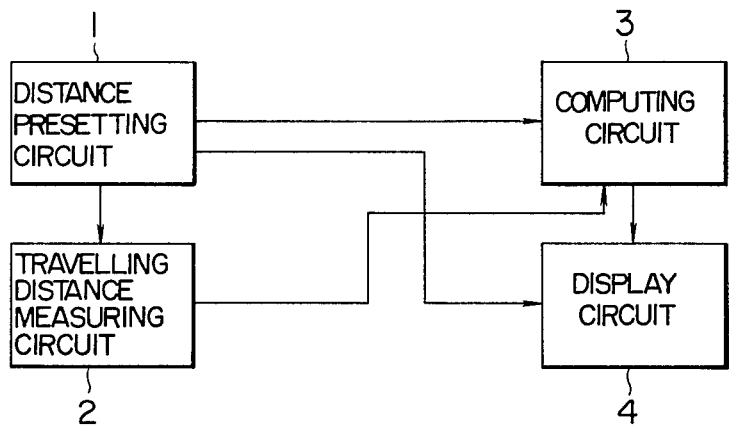
FIG. 1 is a block diagram showing the general construction of a distance meter for vehicles according to an embodiment of this invention.

Referring first to FIG. 1 showing a simplified block diagram of the distance meter according to this invention, numeral 1 designates a distance presetting circuit responsive to the operation of a switch for generating a signal corresponding to the distance from the place of departure of a vehicle to a destination, 2 a travelling distance measuring circuit for generating a signal corresponding to the distance travelled since the departure of the vehicle, 3 a computing circuit for storing the output signal of the distance presetting circuit 1 in response to the presetting of the distance to the destination at the departure place and for counting in the reverse direction and storing the signals generated from the travelling distance measuring circuit 2 during the time that the vehicle is in motion, 4 a display circuit for visually indicating the stored computed value of the computing circuit 3, the display circuit 4 being installed in the driver's compartment of the vehicle such as on the dash board of the vehicle so that the indication by the display circuit 4 is easily seen by the driver.

Next, the detailed construction and operation of the individual circuits in the embodiment shown in FIG. 1 will be described with reference to FIGS. 2 through 6.

Figure 2:
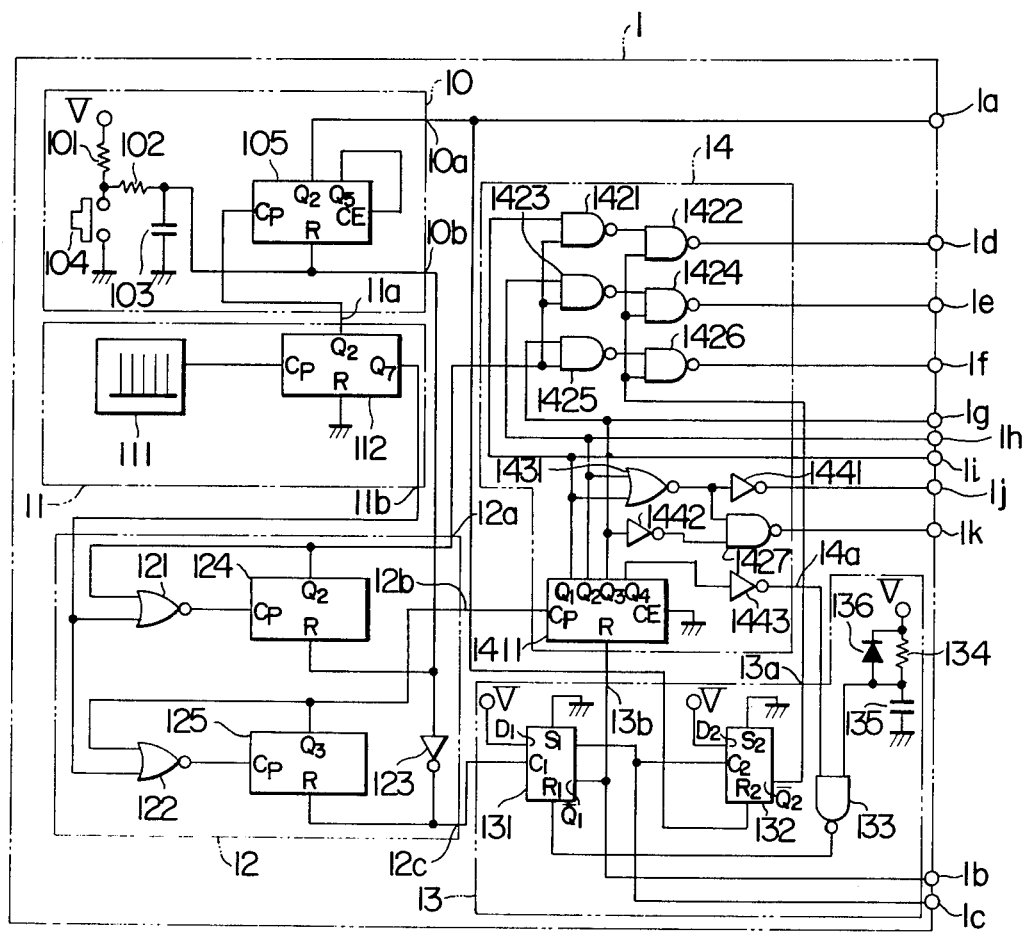
FIG. 2 is a wiring diagram showing an embodiment of one constituent circuit of the distance meter for vehicles according to the invention.

In FIG. 2, there is illustrated a detailed wiring diagram of the distance presetting circuit 1. In FIG. 2, numeral 10 designates a signal generating circuit comprising resistors 101 and 102, a capacitor 103, a push-button switch 104 and a decade frequency dividing circuit 105. The signal generating circuit 10 generates at its terminal 10a as many pulses as equal to the number of times the push-button 104 is closed. On the other hand, as shown by (A) in FIG. 3, a "1" level signal is normally generated at a terminal 10b of the signal generating circuit 10, while a "0" level signal is generated at the terminal 10b in response to the closing of the push-button 104. Numeral 11 designates a reference oscillator circuit comprising a CR oscillation circuit 111 and a binary frequency dividing circuit 112. The reference oscillator circuit 11 generates at its terminal 11a pulses having a frequency which is $\frac{1}{2}^2$ of the oscillation frequency of the CR oscillation circuit 111 and at its terminal 11b pulses having a frequency which is $\frac{1}{2}^7$ of the oscillation frequency of the CR oscillation circuit 111. Numeral 12 designates a level width detecting circuit comprising NOR gates 121 and 122, a NOT gate 123 and binary frequency dividing circuits 124 and 125. As shown by (B) in FIG. 3, the level width detecting circuit 12 generates at its terminal 12a a zero-count indication signal which is normally at the "0" level and which goes to the "1" level during the time that the push-button switch 104 stays closed, namely, when the duration time of the "0" level at the terminal 10b of the signal generating circuit 10 exceeds a predetermined time $T_1$, but goes back to the "0" in response to the releasing of the push-button switch 104. Of course, the time $T_1$ is determined by the oscillation frequency of the oscillation circuit 111 and the output signals of the frequency dividing circuits 112 and 124. Also as shown by (C) in FIG. 3, the level width detecting circuits 12 generates at its terminal 12b a shift signal for presetting the travelling distance to a destination which is normally held at the "1" level and which goes to the "0" level in response to the closing of the push-button switch 104 and goes back to the "1" level at the expiration of a predetermined time after the releasing of the push-button switch 104, namely, when the duration time of the "1" level at the terminal 10b of the signal generating circuit 10 exceeds a predetermined time $T_2$. This time $T_2$ is also determined by the oscillation frequency of the oscillation circuit 111 and the output signals of the frequency dividing circuits 112 and 124. The inverted signal of the output signal at the terminal 12b of the level width detecting circuit 12 is generated at its terminal 12c. Numeral 13 designates a distance presetting time signal generating circuit comprising D-type flip-flops 131 and 132, a NAND gate 133, a resistor 134, a capacitor 135 and a diode 136. In the distance presetting time signal generating circuit 13, the output of the circuit including the resistor 134, the capacitor 135 and the diode 136 goes from the "0" to "1" level with a time constant when the power source is connected and consequently the D-type flip-flop 131 is always reset when the power source is connected. The flip-flop 131 is also reset by the output signal of the NAND gate 133 when the presetting of the distance to a destination is completed.

The distance presetting time signal generating circuit 13 operates as follows. When the pushbutton switch 104 is initially closed after initiating the presetting of the distance to a destination, a signal which goes from the "0" to "1" level is applied to the D-type flip-flop 131 at its terminal $C_1$ so that a terminal $Q_1$ of the flip-flop 131 changes from the "0" to "1" level and its terminal $\overline{Q}_1$ changes from the "1" to "0" level. Since the D-type flip-flop 132 has its terminal $C_2$ connected to the terminal $Q_1$ of the D-type flip-flop 131, a terminal $\overline{Q}_2$ of the D-type flip-flop 132 goes from the "1" to "0" level when the terminal $Q_1$ of the D-type flip-flop 131 goes from the "0" to "1" level. Thereafter, when a positive pulse is applied to a terminal $R_2$ of the D-type flip-flop 132 which is connected to the terminal 10b, the terminal $\overline{Q}_2$ of the D-type flip-flop 132 goes back to the "1" level. Consequently, a negative pulse (hereinafter referred to as an all-reset pulse) is generated at a terminal 13a as shown by (D) in FIG. 3. At a terminal 13b of the distance presetting time signal generating circuit 13 is generated a signal which goes to the "1" level when the power source is connected or when the distance presetting is completed and which goes to the "0" level in response to the initial closing of the push-button switch 104 after initiating the presetting of the distance to destination.

Figure 3:
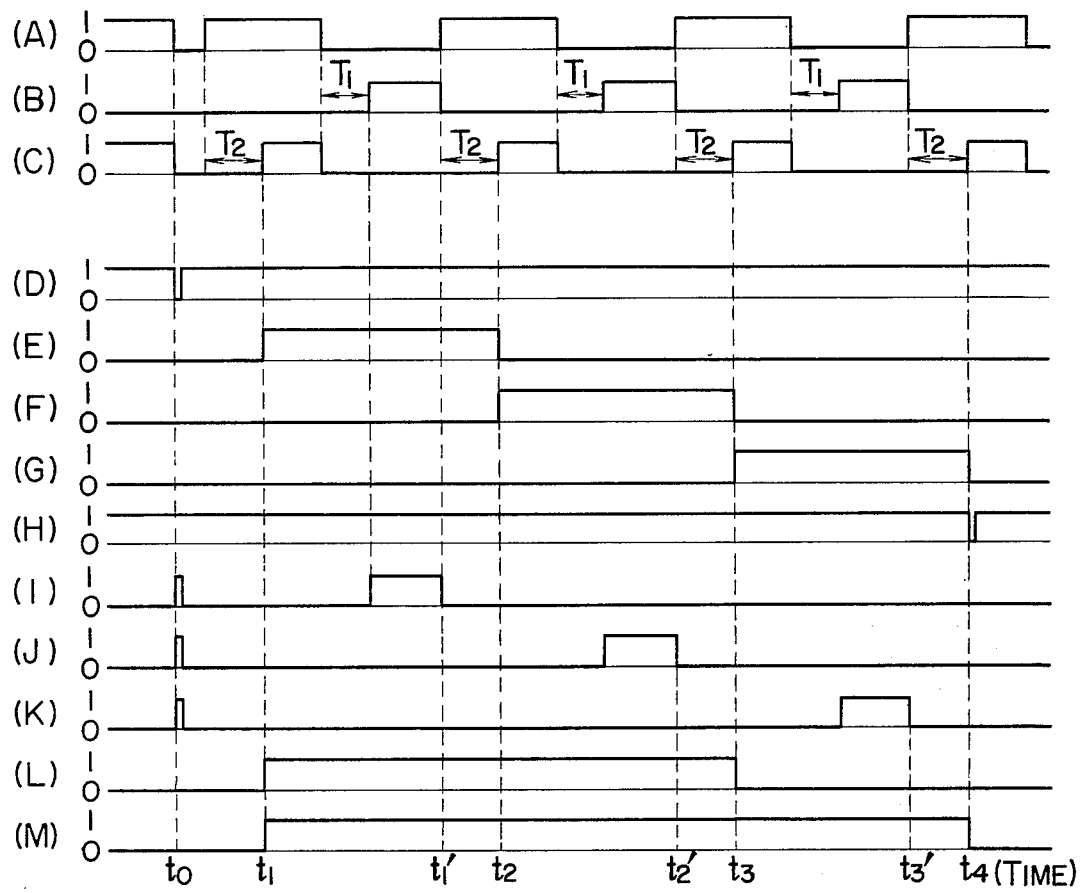
FIG. 3 shows voltage waveform diagrams which are useful in explaining the operation of the distance meter of FIG. 1.

Numeral 14 designates a control signal generating circuit comprising a decade counting circuit 141, NAND gates 1421, 1422, 1423, 1424, 1425, 1426 and 1427, a NOR gate 1431 and NOT gates 1441, 1442 and 1443 and the voltage waveforms generated at various points in the circuit are shown in FIG. 3. Waveform (C) in FIG. 3 shows the previously mentioned shift signal for presetting the distance to destination which is applied to the decade counting circuit 1411 at its terminal Cp from the binary frequency dividing circuit 125 of the level width detecting circuit 12 through the terminal 12b. Waveform (E) in FIG. 3 shows the waveform of a signal generated at a terminal 1i or the output signal at a terminal $Q_1$ of the decade counting circuit 1411, which is normally at the "0" level and which goes to the "1" level in response to the application of the first shift signal to the terminal Cp of the decade counting circuit 1411 after initiating the presetting of the travelling distance to destination and goes back to the "0" level in response to the second shift signal. Waveform (F) in FIG. 3 shows the waveform of a signal generated at a terminal 1h or the output signal at a terminal $Q_2$ of the decade counting circuit 1411, which goes from the "0" to "1" level in response to the application of the second shift signal to the terminal Cp of the decade counting circuit 1411 and which goes from the "1" to "0" level in response to the application of a third shift signal to the same terminal Cp. Waveform (G) in FIG. 3 shows the waveform of a signal generated at a terminal 1g or the output signal from a terminal $Q_3$ of the decade counting circuit 1411, which goes from the "0" to "1" level in response to the application of the third shift signal to the terminal Cp of the decade counting circuit 1411 and which goes from the "1" to "0" level in response to the application of a fourth shift signal (i.e., and end-of-distance presetting signal) to the same terminal Cp. Waveform (H) in FIg. 3 shows the waveform of a signal generated at a terminal 14a or the inverted signal of the output signal from a terminal $Q_4$ of the decade counting circuit 1411, which goes from the "1" to "0" level in response to the application of the end-of-distance presetting signal to the terminal Cp of the decade counting circuit 1411. This "0" level signal is applied to the NAND gate 133 so that the terminal 13b of the distance presetting time signal generating circuit 13 which is connected to the output terminal of the NAND gate 133 goes from the "0" to "1" level and the decade counting circuit 1411 is reset causing the terminal 14a of the control signal generating circuit 14 to go from the "0" to "1" level again. FIG. 3(I) shows the waveform of a signal generated at a terminal 1d and a positive pulse is generated at a time $t_0$. This positive pulse is the inverted pulse of the previously mentioned all-reset pulse. When a zero-count display signal is generated at the terminal 12a during a time period $t_1$ to $t_2$, the signal at the terminal 1d goes from the "0" to "1" level and it again goes from the "1" to "0" level at a time $t_1$. Waveform (J) in FIG. 3 shows the waveform of a signal generated at a terminal 1e and a positive pulse is generated at the time $t_0$ as was the case with the terminal 1d. When a zero-count display signal is generated at the terminal 12a during a time period $t_2$ to $t_3$, the signal at the terminal 1e goes from the "0" to "1" level and it again goes from the "1" to "0" level. Waveform (K) in FIG. 3 shows the waveform of a signal generated at a terminal 1f and a positive pulse is first generated at the time $t_0$ as was the case with the signal waveforms shown by (I) and (J) in FIG. 3. When a zero-count display signal is generated at the terminal 12a during a time period $t_3$ to $t_4$, the signal at the terminal 1f goes from the "0" to "1" level and it again goes from the "1" to "0" level at a time $t_3'$. Waveform (L) in FIG. 3 shows the waveform of a signal generated at a terminal 1j, which goes to the "1" level when either one of the terminals 1h and 1i is at the "1" level. Waveform (M) in FIG. 3 shows the waveform of a signal generated at a terminal 1k, which goes to the "1" level when any one of the terminal 1g, 1h and 1i is at the "1" level.

Figure 4:
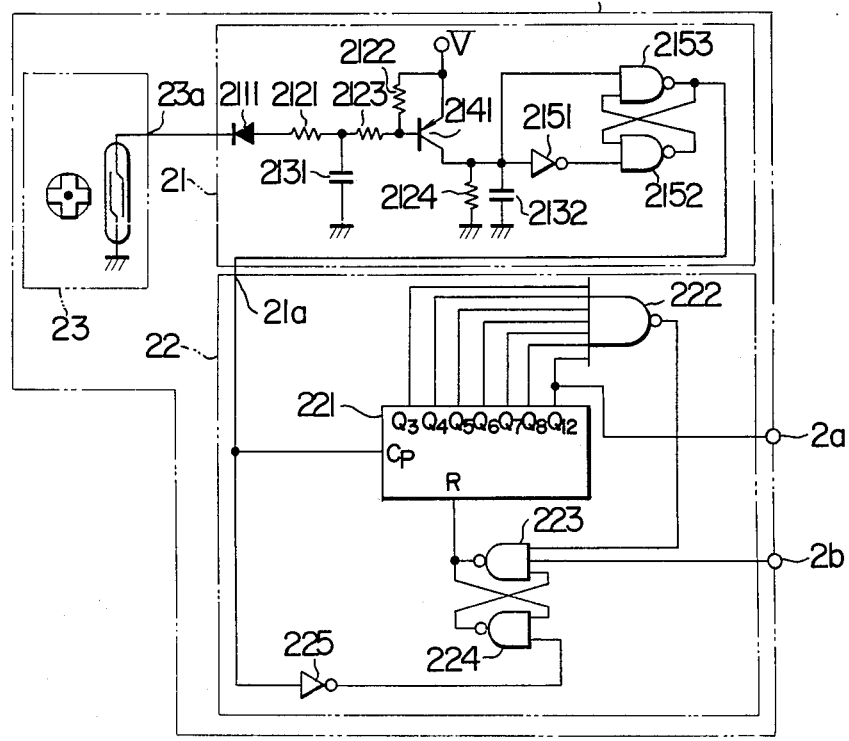
FIGS. 4, 5 and 6 are wiring diagrams showing one embodiment of constituent circuits of the distance meter for vehicles according to the invention.

FIG. 4 is a wiring diagram showing the details of the travelling distance measuring circuit 2. In the Figure, numeral 23 designates a vehicle speed sensor for detecting the rotational speed of the wheel of the vehicle, which comprises for example a small magnet attached to the speedometer cable and a reed switch disposed adjacent to the small magnet to thereby generate at a terminal 23a a vehicle speed signal consisting of four pulses per revolution of the speedometer cable. Numeral 21 designates a waveform shaping circuit comprising a diode 2111, resistors 2121, 2122, 2123 and 2124, a transistor 2141, capacitors 2131 and 2132, a NOT gate 2151 and NAND gates 2152 and 2153, thereby receiving the vehicle speed signal from the vehicle speed sensor 23 and generating the reshaped vehicle speed signal at its terminal 21a. Numeral 22 designates a frequency dividing circuit comprising a binary frequency divider 221 (e.g., the known RCA CD4040AE), NAND gates 222, 223 and 224 and a NOT gate 225 for generating at its terminal 2a a pulse for every 1 km travelled by the vehicle. The other terminal 2b is connected to the terminal 1b of the distance presetting circuit 1 shown in FIG. 2 so that when presetting the distance to destination, a reset signal is introduced through the terminal 2b resetting the binary frequency divider 221.

Figure 5:
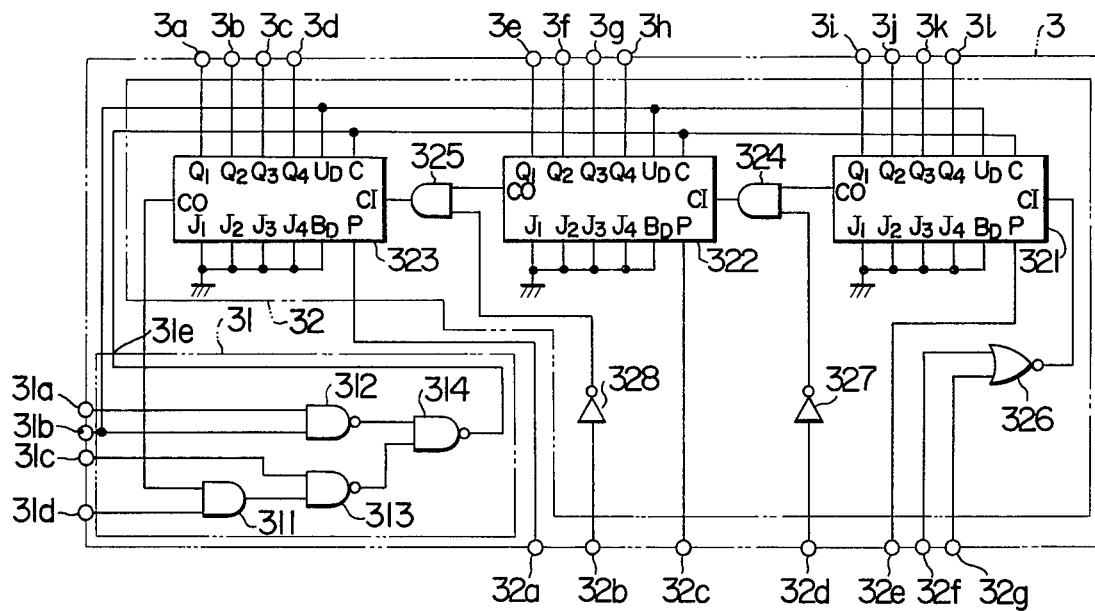

FIG. 5 is a wiring diagram showing the details of the computing circuit 3. In the Figure, numeral 31 designates a signal selection circuit comprising an AND gate 311, NAND gates 312, 313 and 314 and having its terminals 31a, 31b, 31c and 31d respectively connected to the terminals 1a, 1c, 1b(FIG. 2) and 2a(FIG. 4). When presetting the travelling distance to destination, the signal from the terminal 1a is generated at an output terminal 31e of the signal selection circuit 31, while the signal from the terminal 2a is generated at the output terminal 31e when the vehicle is in motion. Numeral 32 designates a counting and storing circuit comprising decade up-down counter circuits 321, 322 and 323 (e.g., the RCA CD4029AE), AND gates Q and 325, a NOR gate 326 and NOT gates 327 and 328. In this counting and storing circuit 32, when the positive pulse shown in FIG. 3(I) is applied to a terminal 32a connected to the terminal 1d shown in FIG. 2, all of terminals $Q_1$, $Q_2$, $Q_3$ and $Q_4$ of the decade up-down counter circuit 323 go to the "0" level. On the other hand, when the positive pulse shown by (J) in FIG. 3 is applied to a terminal 32c connected to the terminal 1e shown in FIG. 2, all of terminals $Q_1$, $Q_2$, $Q_3$ and $Q_4$ of the decade up-down counter circuit 322 go to the "0" level. Similarly, when the positive pulse shown by (K) in FIG. 3 is applied to a terminal 32e connected to the terminal 1f shown in FIG. 2, all the terminals $Q_1$, $Q_2$, $Q_3$ and $Q_4$ of the decade up-down counter circuit 321 go to the "0" level. When a terminal 32b connected to the terminal 1i shown in FIG. 2 goes to the "1" level causing a terminal CI of the decade up-down counter circuit 323 to go to the "0" level, if there are pulses applied to a terminal C of the decade up-down counter circuit 323, this up-down counter circuit 323 counts the applied pulses. Similarly, when a terminal 32d connected to the terminal 1h shown in FIG. 2 goes to the "1" level, the decade up-down counter circuit 322 counts the pulses applied to its terminal C. When a terminal 32f connected to the terminal 1g shown in FIG. 2 goes to the "1" level, the decade up-down counter circuit 321 counts the pulses applied to its terminal C. A terminal 32g connected to the terminal 1b shown in FIG. 2 goes to the "0" level when presetting the travelling distance to destination, while the terminal 32g goes to the "1" level when measuring the distance travelled by the vehicle.

The operation of the computing circuit 3 is as follows. When presetting the travelling distance to destination, as shown by (I), (J) and (K) in FIG. 3, a positive pulse is applied first to the terminals 32a, 32c and 32e, respectively, causing the outputs at the terminals $Q_1$, $Q_2$, $Q_3$ and $Q_4$ of the decade up-down counter circuits 321, 322 and 323, respectively, to go to the "0" level. Then, when the terminal 32b goes to the "1" level at the time $t_1$, the decade up-down counter circuit 323 counts up in accordance with the number of times the push-button switch 104 (FIG. 2) is closed. Then, when a shift signal is generated at the time $t_2$, the terminal 32b goes to the "0" level and the terminal 32d goes to the "1" level. When this occurs, the decade up-down counter circuit 322 counts up in accordance with the number of times that the push-button switch 104 is closed. Then, as the next shift signal is generated at the time $t_3$, the terminal 32d goes to the "0" level and the terminal 32f goes to the "1" level. Consequently, the decade up-down counter circuit 321 counts up similarly in accordance with the number of times that the push-button switch 104 is closed.

While the distance to destination is preset in the manner described above, when it is desired to set to zero the count value of each of the decade up-down counter circuits, it is only necessary to generate a zero-count display signal by closing the push-button switch 104 for a time period longer than the predetermined time $T_1$ shown in FIG. 3 during the counting time of the decade up-down counter circuit corresponding to the digit in question. Each of three right-side "0" level portions of the waveform shown by (A) in FIG. 3 shows that the closing time of the push-button switch 104 is longer than the predetermined time $T_1$ and thus the preset distance is 0 km. For example, the distance of 605 km is preset in the following manner. The push-button switch 104 is first closed once to clear the contents of the decade up-down counter circuits 321, 322 and 323. At the expiration of the predetermined time $T_2$, the push-button switch 104 is closed 6 times causing the decade up-down counter 323 to count and store 6. Note that no shift signal is generated at the terminal 12b if the push-button switch 104 is not closed after the predetermined time $T_2$. At the expiration of a time longer than the time $T_2$ after storing 6 in the decade up-down counter circuit 323, the push-button switch 104 is closed longer than the time $T_1$ causing the decade up-down counter circuit 322 to count and store zero. At the expiration of a time longer than the time $T_2$ after completing these operations, the push-button switch 104 is closed 5 times causing the decade up-down counter circuit 321 to count and store 5. In this way, the distance of 605 km is preset. At the time $t_4$ after the expiration of the time $T_2$ after the presetting of the distance, the terminal 31b goes to the "0" level and the decade up-down counter circuits 321, 322 and 323 perform the decimal backward counting. Also the terminals 32b, 32d and 32f go to the "0" level and the terminal 32g goes to the "1" level so that the decade up-down counter circuits 321, 322 and 323 are in effect connected in series with one another. Consequently, the pulse signals generated at the rate of one pulse for every 1 km travelled by the vehicle and applied to the terminal 31d are counted in the reverse direction. When the count value of the decade up-down counter circuits 321, 322 and 323, respectively, is counted down to zero, a terminal CO of the decade up-down counter circuit 323 goes to the "0" level so that even if a further signal from the vehicle speed sensor 23 (FIG. 4) is generated at the terminal 31d, the output of the AND gate 311 remains at the "0" level preventing the passage of the signal and the count values remain at "0".

Figure 6:
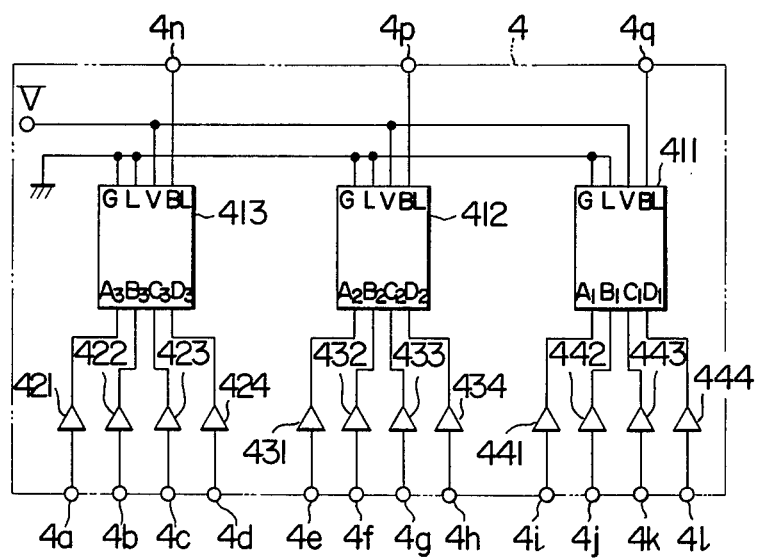

FIG. 6 is a wiring diagram showing the details of the display circuit 4. In the Figure, numerals 411, 412 and 413 designate light-emitting diode (LED) digital display units (e.g., the Hewlett Packard Inc. 5082-7340), 421, 422, 423, 424, 431, 432, 433, 434, 441, 442, 443 and 444 buffers. Input terminals 4a, 4b, 4c and 4d are respectively connected to output terminals 3a, 3b, 3c and 3d of the computing circuit 3 shown in FIG. 5. Input terminals 4e, 4f, 4g and 4h are respectively connected to output terminals 3e, 3f, 3g and 3h of the computing circuit 3. Input terminals 4i, 4j, 4k and 4l are respectively connected to output terminals 3i, 3j, 3k and 3l of the computing circuit 3. Input terminals 4n, 4p and 4q are respectively connected to the output terminals 1i, 1j and 1k of the distance presetting circuit 1 shown in FIG. 2. The LED digital display units 411, 412 and 413 respectively display the output of the decade up-down counter circuits 321, 322 and 323 in decimal form. When the terminal 4n is at the "1" level, the LED digital display unit 413 is blanked, whereas the display unit 412 is blanked when the terminal 4p is at the "1" level. When the terminal 4q is at the "1" level, the display unit 411 is blanked.

In accordance with the foregoing description, the operation of the device of this invention may be summarized as follows. In the distance presetting circuit 1, the bush-button switch 104 is closed once clearing the contents of the decade up-down counter circuits 321, 322 and 323 in the computing circuit 3. Then, the output at the terminal 32b of the computing circuit 3 goes to the "1" level after the expiration of the predetermined time $T_2$, the push-button switch 104 is closed as many times as equal to the value of the most significant one of the digits representing the distance to be preset and the value is then set and stored in the decade up-down counter circuit 323. Similarly, at the expiration of another predetermined time $T_2$ the output at the terminal 32d goes to the "1" level and the value of the next more significant digit of the distance to be preset is set and stored in the decade up-down counter circuit 322 by the closing of the push-button switch 104. In the like manner, at the expiration of still another predetermined time $T_2$ the output at the terminal 32f goes to the "1" level and the value of the least significant digit of the distance to be preset is set and stored in the decade up-down counter circuit 321. After the expiration of still another predetermined time $T_2$ after the completion of the setting and storing of the distance in these decade up-down counter circuits, the output signals at the output terminals 32b, 32d and 32f go to the "0" level and the decade up-down counter circuits are practically connected in series with one another. The output signal from the travelling distance measuring circuit 2 (FIG. 4) which corresponds to the distance travelled by the vehicle is received through the input terminal 31d by the computing circuit 3 to count in the backward direction. The resulting computed value is applied through the output terminals (3a, 3b, 3c, 3d; 3e, 3f, 3g, 3h; 3i, 3j, 3k, 3l) of the computing circuit 3 to the corresponding input terminals (4a, 4b, 4c, 4d; 4e, 4f, 4g, 4h; 4i, 4j, 4k, 4l) of the display circuit 4 and the LED digital display units 411, 412 and 413 display the remaining distance to the destination.

While, in the embodiment of this invention described hereinabove, the circuit construction of the computing circuit 3 comprises the decade up-down counter circuits 321, 322 and 323 as shown in FIG. 5, this is illustrative only and not restrictive. For instance, any other computing method such as one comprising parallel decimal subtractor circuits employing BCD adders or a static computing circuit employing an ROM (READ ONLY MEMORY) may be used for obtaining the difference (i.e., the preset distance minus the measured distance travelled) and displaying the resulting count.

Further, while, in the above described embodiment, the display circuit 4 comprises the LED digital display units 411, 412 and 413 are used, the display may comprise crystal readouts, plasma display elements, cathode ray tubes, electromagnetic counters or the like.

Furthermore, while, in the above-described embodiment, the travelling distance measuring sensor 23 of the travelling distance measuring circuit 2 comprises a vehicle speed sensor including a small magnet attached to the speedometer cable and a reed switch located adjacent to the magnet for generating a revolution signal consisting of four pulses per every one revolution of the cable, the sensor 23 may comprise of any other type of sensor such as an optical sensor or electromagnetic sensor capable of measuring the distance travelled.

We claim:

1. A distance meter for a vehicle for displaying the remaining distance to a destination, said meter comprising:

distance presetting means for presetting the distance of travel of a vehicle from a starting point to a destination at said starting point and for generating a preset distance signal representative of said preset distance, said distance presetting means including switch means disposed to be opened and closed, the presetting of said preset distance being accomplished in accordance with the number of on-off operations of said switch means;

travelling distance measuring means connected to said distance presetting means for generating a travelling distance signal for every predetermined distance travelled by said vehicle, said travelling distance measuring means including a vehicle speed sensor for detecting the rotational speed of the wheel of said vehicle to generate a vehicle speed pulse signal, and a frequency dividing circuit for frequency dividing said vehicle speed pulse signal to generate said travelling distance signal, said frequency dividing circuit being disposed to be reset in response to the first closing of said switch means during a distance presetting operation;

computing means connected to said distance presetting means and said travelling distance measuring means for repeatedly subtracting said predetermined distance travelled by said vehicle from said preset distance represented by said preset distance signal in response to the generation of said travelling distance signals to compute the remaining distance to said destination; and display means connected to said computing means for displaying the result of said computation by said computing means.

2. A meter according to claim 1, wherein said distance presetting means further includes means for measuring the duration of on-off operation of said switch means and for applying a shift signal instructing a shift of said preset distance to said computing means when said duration of on-off operation of said switch means exceeds a predetermined time.

3. A meter according to claim 2, wherein said computing circuit includes a plurality of decade up-down counter circuits each corresponding to one of the digits representing said preset distance, whereby in response to said shift signal generated after the completion of said presetting of distance said decade up-down counter circuits are substantially connected in series with one another to count said travelling distance signals in the backward direction.

4. A meter according to claim 1, wherein said distance presetting means comprises:
- a signal generating circuit including said on-off switch means for generating said preset distance signal consisting of pulses corresponding in number to the number of operations of said switch; and
- a level width detecting circuit connected to said signal generating circuit for generating a zero-count display signal indicating that the value of one of the digits representing said preset distance is zero when the duration of closing of said on-off switch means exceeds a first predetermined time and for generating a shift signal instructing a shift of said preset distance when the duration of opening of said on-off switch means exceeds a second predetermined time.

5. A meter according to claim 1, wherein said computing circuit includes a plurality of decade up-down counter circuits each corresponding to one of the digits representing said preset distance.

* * * * *